Feb. 10, 1959 G. H. KOCH ET AL 2,872,988
AIR TRANSLATING APPARATUS
Filed Sept. 10, 1954 2 Sheets-Sheet 2
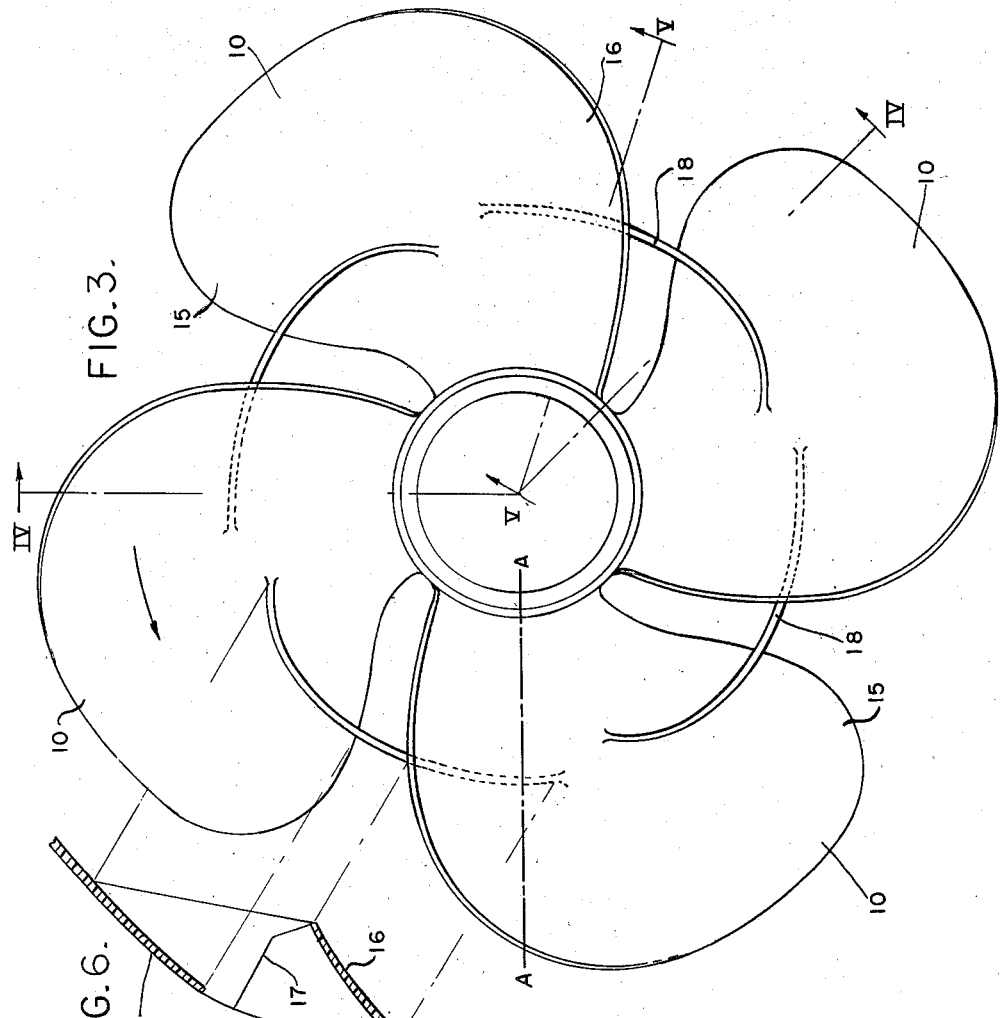
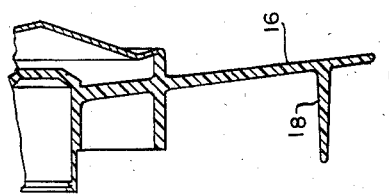
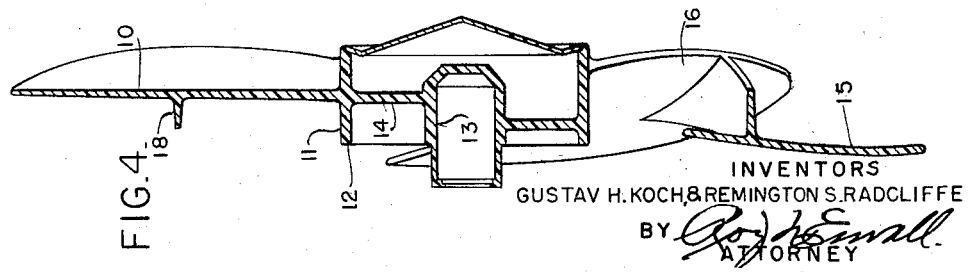
INVENTORS
GUSTAV H. KOCH, & REMINGTON S. RADCLIFFE
BY
ATTORNEY

United States Patent Office 2,872,988
Patented Feb. 10, 1959

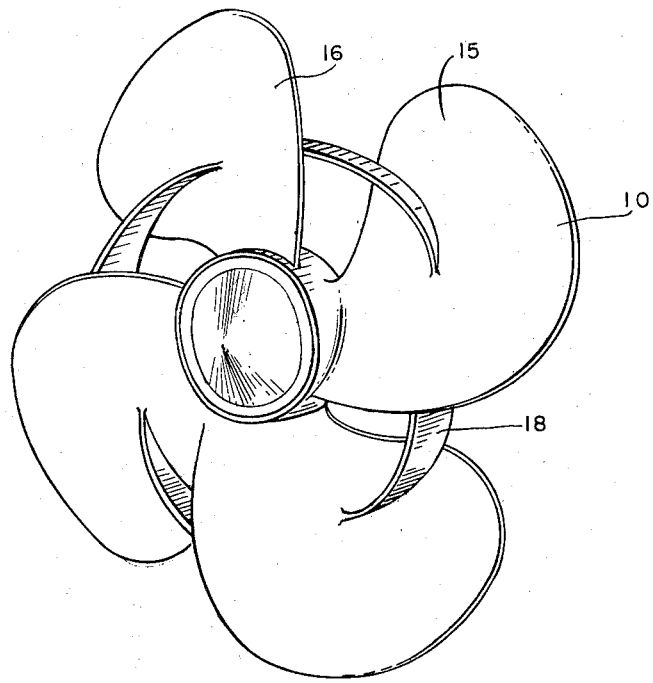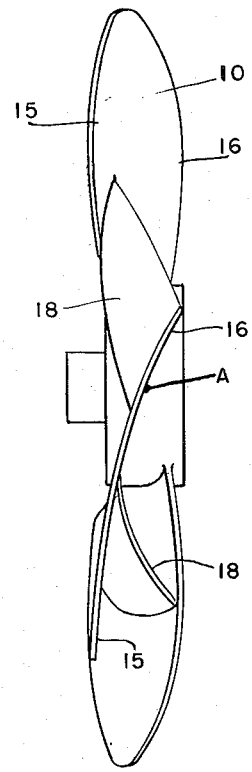

2,872,988
AIR TRANSLATING APPARATUS

Gustav H. Koch and Remington S. Radcliffe, Springfield, Mass., assignors to Westinghouse Electric Corporation, East Pittsburgh, Pa., a corporation of Pennsylvania Application September 10, 1954, Serial No. 455,304

4 Claims. (Cl. 170—169)

Our invention relates to a propeller fan, and it has for an object to maintain the shape or form and thereby the efficiency of the fan.

A more particular object is to avoid dimensional changes of a fan comprising a single molded piece of a thermo plastic material.

In accordance with our invention, we provide connecting wings each joining the leading edge portion of one blade to the trailing edge portion of the adjacent blade. The connecting wing is disposed with its width extending parallel to the axis of rotation and with its length extending in a generally circumferential direction. The connecting wings are disposed in the mid-region between the inner and outer peripheries of the blades.

These and other objects are effected by our invention as will be apparent from the following description taken in connection with the accompanying drawings, forming a part of this application, in which:

Fig. 1 is a perspective view of a propeller fan in accordance with our invention;

Fig. 2 is a side or edge view thereof;

Fig. 3 is a front elevation;

Fig. 4 is a section taken on the line IV—IV of Fig. 3;

Fig. 5 is a sectional view taken on the line V—V of Fig. 3; and

Fig. 6 is a developed view showing one of the connecting wings and also showing the connected portions of the adjacent blades in section.

Referring to the drawings in detail, the fan is made of a single piece of solid, molded material, such as a thermo plastic. It comprises four blades 10 connected in an annular row to a hub portion 11. The hub portion comprises an outer cylinder 12, an inner cylinder 13 and radial connecting portions 14 disposed in alignment with the blades.

Each blade has a leading edge portion 15 which is overhanging; i. e. it extends circumferentially beyond the connection of the blade to the hub. Each blade also has a trailing edge portion 16 which is not overhanging.

Each blade, which is generally arcuate in cross section, is curved about an axis or axes parallel to the line A—A of Fig. 3. The blade is disposed so that, along line A—A, the blade extends perpendicular to the axis, i. e. radial. This line is also shown end-wise in Fig. 2 as a dot designated by the reference character A. The leading edge portion 15, in a section on a plane containing the axis, is disposed at a small angle to a plane normal to the axis, as shown by the lower half of the section of Fig. 4, taken on the line IV—IV. This blade section diverges to the rear of such plane, so that centrifugal force imposes a forward thrust on the leading edge portion. This form of blade also has a trailing edge portion 16 which, in radial section as shown in Fig. 5, diverges forwardly with respect to a plane normal to the axis of rotation, so that centrifugal force imposes a rearward thrust on the trailing edge portion. The result is that the blade tends to rotate toward a position in which it lies at a smaller angle to a plane normal to the axis of rotation. It has been found that prolonged stress conditions of this character produced by extended periods of operation cause a cold flow movement of the character stated. This movement is what is known as "feathering" or reduction of pitch of the blades, thereby resulting in reduced air flow and lowered efficiency of the fan.

In accordance with our invention, we provide connecting members or wings 18, each of which connects the leading edge portion of one blade to the trailing edge portion of the adjacent blade. The connecting wing is disposed in the region midway between the radially inner and outer ends or peripheries of the blades and it extends in a generally circular direction, although preferably it departs somewhat from exact circular, as will be later explained. The width of the connecting wing extends parallel to the axis of rotation. These connecting wings are integral with the adjacent blades and are an integral part of the one piece molded thermo plastic fan. Each connecting wing is integral with one blade on the fan outlet side from the leading edge for a substantial distance toward the trailing edge and it is also integral with the next blade on the fan inlet side at the trailing edge and for a distance toward the leading edge. The peripheral or arcuate extent of each wing is less than the arcuate extent of the blade at the radius at which the wings are disposed, so that the ends of adjacent wings are spaced from each other as shown in Fig. 3.

Through these connecting wings, the forward thrust of the leading edge portion and the rearward thrust of the trailing edge portion are imposed against each other and neutralize each other to the extent of the value of the lesser thrust, which is that of the trailing edge portion. The excess thrust of the leading edge portion, however, is adequately resisted by the adjacent blade to which the connecting wing is connected, particularly in view of the curved form thereof.

Each connecting wing is preferably disposed at a gradually decreasing radius in the direction from the leading edge toward the trailing edge, that is, each wing diverges toward the axis of rotation in a direction opposite of the direction of rotation. The reason for this is that air flows radially inwardly to some extent along the surface of the blade of a propeller fan, so that the connecting wing portions are thereby disposed more nearly in line with the path of movement with the air and thereby provide minimum interference with the flow of air.

That portion of the connecting wing which joins the leading edge is formed by that part of the mold which forms the front face of the blade and the part of the connecting wing that joins the trailing edge is formed by the mold that forms the rear face of the blades, and one of the part lines between the mold parts where they form the connecting wings is shown at 17.

We have found that a fan of the form shown and described has dimensional stability and that the changes due to cold flow induced by centrifugal force are overcome.

While the invention has been shown in but one form, it will be obvious to those skilled in the art that it is not so limited, but is susceptible of various changes and modifications without departing from the spirit thereof.

What we claim is:

1. A free air propeller fan integrally constructed of molded thermoplastic material and comprising a hub, a plurality of blades connected to said hub and extending radially outwardly therefrom, said blades being disposed in an annular row and each blade being disposed in a generally helical direction, a portion of each blade adjacent the leading edge being so formed that, in a plane containing the axis of rotation, the blade diverges rearwardly with respect to a plane normal to the axis of rotation, and a portion of each blade adjacent the trailing edge being so formed that, in a plane containing the axis, the blade diverges forwardly with respect to a plane normal to the axis, whereby centrifugal force imposes forward and rearward thrust on said leading and trailing edges, respectively, and a member connected to one blade on the fan outlet side for a substantial distance from a point adjacent the leading edge toward the trailing edge and connected to the adjacent blade on the fan inlet side for a substantial distance from a point adjacent the trailing edge toward the leading edge, said member having its length extending in a generally circular direction and its width extending axially, there being a plurality of said members disposed in the region midway between the inner and outer peripheries of the blades.

2. A fan as set forth in claim 1, wherein the hub, the blades and the connecting members are comprised of one solid piece of molded thermoplastic material.

3. A fan as set forth in claim 1 wherein each connecting member diverges toward the axis in the direction opposite of the direction of rotation.

4. A fan as set forth in claim 1 wherein the hub, the blades and the connecting members are comprised of one solid piece of molded thermoplastic material, the circular extent of each connecting member is less than the circular extent of each blade at the radius at which the connecting member is disposed, and each connecting member is disposed at a gradually decreasing radius in the direction from the leading edge toward the trailing edge.

References Cited in the file of this patent

UNITED STATES PATENTS

| | | |
|---|---|---|
| 265,984 | Schmolz | Oct. 17, 1882 |
| 2,454,200 | Perkins | Nov. 16, 1948 |
| 2,616,511 | Perrott | Nov. 4, 1952 |

FOREIGN PATENTS

| | | |
|---|---|---|
| 4,718 | Great Britain | of 1909 |
| 24,148 | Great Britain | of 1908 |
| 458,809 | Italy | Aug. 4, 1950 |
| 860,154 | Germany | Dec. 18, 1952 |